United States Patent [19]

Foo et al.

[11] 4,442,582
[45] Apr. 17, 1984

[54] METHOD OF RECLAIMING COMPONENT MATERIALS

[75] Inventors: George Foo, Princeton; Raymond W. Grodkiewicz, Bridgewater; Stanley E. Kubis, Bayonne; Gordon C. Lindsay, Red Bank, all of N.J.

[73] Assignees: AT&T Technologies, Inc., New York; Nassau Recycle Corporation, Staten Island, both of N.Y.

[21] Appl. No.: 390,717

[22] Filed: Jun. 21, 1982

[51] Int. Cl.³ .............................. B23Q 17/00
[52] U.S. Cl. ..................................... 29/403.3
[58] Field of Search ............... 29/403.1, 403.3, 402.01, 29/402.02, 402.04, 402.05, 402.06, 402.07, 402.08, 402.09, 402.11, 402.14, 402.12, 402.15, 402.17

[56] References Cited

U.S. PATENT DOCUMENTS

| 25,371 | 9/1859 | Scoville . | |
|---|---|---|---|
| 3,605,243 | 9/1971 | Oster | 29/403 |
| 4,043,019 | 8/1977 | Schroder | 29/427 |

FOREIGN PATENT DOCUMENTS

| 54-7272 | 4/1979 | Japan | 29/403.2 |
|---|---|---|---|
| 1257394 | 12/1971 | United Kingdom . | |

OTHER PUBLICATIONS

"Shoe", Washington Post, Aug. 7, 1982, by Jeff MacNelly.

Primary Examiner—Mark Rosenbaum
Assistant Examiner—V. K. Rising
Attorney, Agent, or Firm—David P. Kelley

[57] ABSTRACT

Component materials of an article having a metallic element encased within a brittle bulb are reclaimed by passing the article between two rotating rollers spaced apart a distance less than a dimension of the bulb but greater than a dimension of the metallic element thereby shattering the bulb without altering the structure of the metallic element. The shattered brittle bulb material is then separated from the metallic element as with a magnetic separator.

6 Claims, 3 Drawing Figures

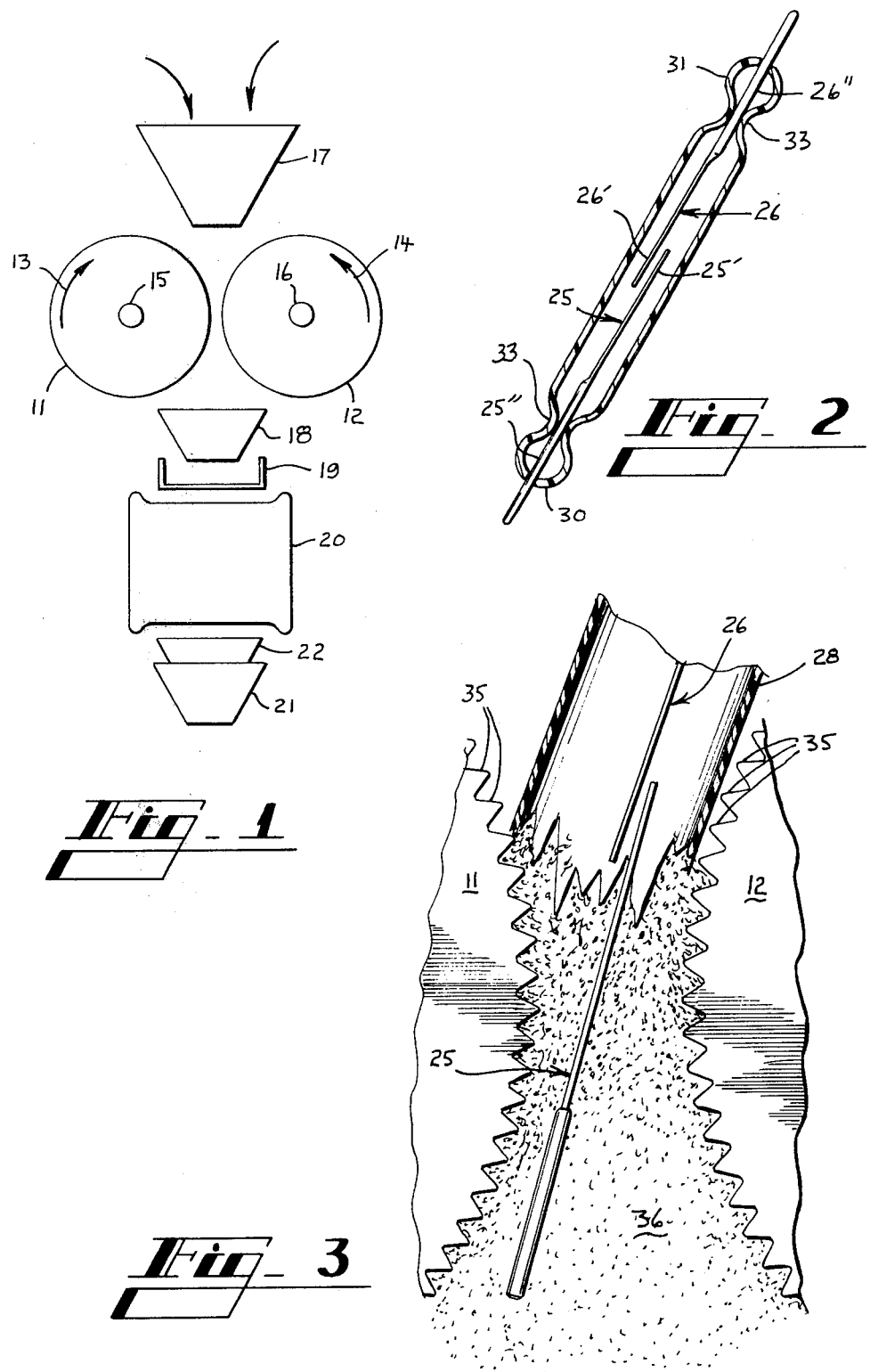

METHOD OF RECLAIMING COMPONENT MATERIALS

TECHNICAL FIELD

This invention relates to methods of reclaiming component materials of articles of manufacture of a type having a metallic element encased within a brittle, non-metallic bulb or housing.

BACKGROUND OF THE INVENTION

Some articles of manufacture have metallic elements encased wholly or partially within brittle, non-metallic bulbs or housings. For example, reed switches commonly have two metallic elements that extend into a cylindrically-shaped vitreous bulb. A portion of each element located within the bulb constitutes a switch blade while a portion located outside of the bulb provides a connecting pin. When such reed switches become impaired or inoperative they often are discarded as waste. In some cases, however, the impaired switches are processed to reclaim their component materials.

Since the metallic components of reed switches are partially encased within glass bulbs their metallic and vitreous elements cannot be readily separated by use of gravity tables, centrifuges or the like since the elements are physically attached and fused to each other so as to provide a vacuum-tight seal. Heretofore, their component materials have been reclaimed by melting the switches and separating the vitreous material from the metal by skimming. This process however has the distinct disadvantages of being slow, costly and inefficient. It therefore would be advantageous to devise a mechanical method of separating the materials without having to melt any of the switch components.

There are mechanical devices available for fragmenting natural materials such as rocks and stones as well as for crushing articles of manufacture. These include hammers, hoppers having means for oscillating one hopper wall against another, rolling mills, hollow cylinders having impact elements housed therewithin, and rotating wheels and rollers that bear spikes, blades or teeth. For example, U.S. Pat. No. 25,371 discloses a machine having a pair of cylinders provided with peripheral teeth that rotate almost in contact with one another to crack or break up stones. This particular machine also has a funnel-shaped hopper dressed with teeth, ribs or projections that prevents stones from rising up therewithin when engaged by the cylinder teeth so that the cylinders are able to seize them. U.S. Pat. No. 3,605,243 discloses a method of removing iron and copper contaminants from zinc or aluminum base scrap wherein the base scrap is fragmented and rolled in a rolling mill so as to have a maximum thickness not greater than that of the iron or copper. The fragments are then tumbled to cause the iron or copper to break away from the zinc or aluminum. U.S. Pat. No. 4,043,019 discloses a method of removing plastic from within metallic bottle caps wherein caps are placed in a drum that has projections and which contain steel impact balls. The caps are cooled to cause the plastic to become more brittle than the metallic caps. The drum is then rotated whereupon the projections and the steel balls impact the caps and break up the brittle plastic without actually breaking the metallic caps. The plastic then may fall free from the caps. As yet another example, United Kingdom Pat. No. 1,257,394 teaches apparatus for crushing cans and bottles having a crushing zone of generally V-shaped cross-section formed by two plates. One zone plate is fixed while the other is adapted to be oscillated towards and away from the fixed plate in effecting a crushing operation.

Unfortunately, the just-described apparatuses cannot be effectively used in reclaiming articles of manufacture that have metallic elements encased within vitreous bulbs or housings. To use the reed switch example again, these prior art devices and methods are not suitable because they would tend not only to shatter the vitreous bulbs but also to mangle the metallic switch blades themselves. These blades, however, typically have a layer of gold coated upon an iron-cobalt-vanadium substrate in their areas of mutual contact. Thus, after the blades have been removed from the vitreous bulb material they need to be further processed in order to extract their gold content from their alloy content. This may be done by the conventional process of placing the blades within a wire mesh cylinder and rotating it in a cyanide stripping solution. However, if the blades themselves have been badly mangled portions of them will have become inaccessible by the stripping solution so that following the stripping process some of the gold will remain unreclaimed on the blades.

Thus a method of reclaiming component materials of an article of manufacturing having a metallic element encased within a brittle bulb remains desirable which does not significantly effect the structural configuration of the metallic elements themselves. It is to this task to which the present invention is primarily directed.

SUMMARY OF THE INVENTION

A method is now provided for reclaiming component materials of an article of manufacture having a metallic element encased within a brittle bulb with a portion of the element encased within the bulb being of a predetermined thickness. In a preferred form the method comprises the steps of passing the article between two rotating rollers spaced apart a distance less than a minimal dimension of the brittle bulb but greater than the thickness of the metallic element encased portion thereby shattering the bulb without substantially altering the structure of the metallic element encased portion. The shattered brittle bulb material is then separated from the metallic element.

BRIEF DESCRIPTION OF THE DRAWING

FIG. 1 is a diagrammatical view of apparatus being used in practicing principles of the invention;

FIG. 2 is a side view, shown partially in cross-section, of a reed switch of a type whose component materials may be reclaimed in accordance with principles of the invention; and FIG. 3 is an enlarged, fragmentary view in side elevation, of a portion of the apparatus shown in FIG. 1 in the process of reclaiming component materials of a reed switch of the type illustrated in FIG. 2.

DETAILED DESCRIPTION

With reference next to the drawing there is diagrammatically shown in FIG. 1 apparatus for reclaiming composite materials of reed switches of the type illustrated in FIG. 2. The apparatus includes a pair of rollers 11 and 12 which are driven in mutually counter-rotational directions as indicated by arrows 13 and 14 by unshown motor means coupled with roller drive shafts 15 and 16. The rollers are spaced apart a distance less than a dimension of one component but greater than a dimension of another component of the article to be processed as hereinafter described in more detail. An input chute or hopper 17 is mounted above the rollers while an output chute 18 is mounted beneath the rollers above a vibratory feeder 19. The vibratory feeder is mounted to feed materials gravitated thereon through the output chute to a magnetic separator 20. Finally, collection bins 21 and 22 are mounted beneath the magnetic separator to receive the separated materials. The vibratory feeder may be an Eriez Manufacturing Company Model No. 45A feeder while the magnetic separator may be an Eriez Manufacturing Company Model No. 25A separator.

With reference next to FIG. 2 one of the reed switches is seen to include a pair of metallic alloy switch blades 25 and 26 encased within a generally cylindrical, glass bulb 28. The contact portion 25'/26' of each blade within the bulb is flat and plated with gold. This portion unitarily merges with a cylindrical portion 25"/26" that extends through neckdown bulb portions 30 and 31 in sealed relation therewith to the exterior of the glass bulb where it is excessible for electrical connection.

With reference next to FIG. 3 the rollers 11 and 12 are shown in more detail as having their cylindrical peripheries formed with serrations 35 for seizing the reed switches as they are gravitated en masse therebetween from the input hopper 17. These serrations are sized such that the troughs therebetween are too small for individual reed switches to become lodged therein yet large enough to seize the switch bulbs and draw them between the rollers. For example, rollers of 9 inch diameter and 6 inch peripheral surface widths formed with 14 serrations per inch of 25 mil depth have been used successfully to reclaim reed switches whose bulbs have had a diameter of approximately 102 mils and whose switch blade contact portions were about 7 mils thick and 48 mils wide. For these particular switches the rollers were located with respect to each other so as to present a gap between their serrated surfaces at their point of closest approach of 30 mils. Thus, the gap was smaller than the bulb diameter to insure that the brittle bulbs were shattered yet greater than the thickness of the blades to inhibit their being mangled by passage through the rollers. Good feed through was achieved without clogging of the roller serration troughs and without substantial mangling of most of the switch blades. Indeed, with proper infeed speed no mangling at all can be achieved. This is true even though the widths of the blades is greater than the roller gap. Once the bulbs have shattered the liberated blades in striking the roller serrations become oriented so as to fall through the gap without being squeezed by the serrations of the two rollers, simultaneously.

The bulb neckdown portions 30 and 31 are also shattered by the roller even though they include annular collar portions 33 that are actually fused to the blade cylindrical portions 25"/26" and which are of a diameter smaller than the gap between the rollers. The force applied to the glass bulbs is sufficient to create fissures or cracks that extend into or through the collar areas to break the fusion here between glass and metal sufficient to liberate the collars. Only about one in several hundred blades still have a glass collar or bulb neckdown portion still attached to metal after having been processed in this manner.

In operation reed switches are gravitated en masse down into the hopper 17 from which they are metered, by virtue of their size in conjunction with the size of the bottom opening of the hopper and infeed speed, down between the rotating rollers 11 and 12. As best shown in FIG. 3 the reed switches are then gripped by the serrations and forced down between the two rotating rollers. Since the rollers are spaced apart a distance less than the diameter of the glass bulbs the bulbs are thereby shattered into small fragments 36. However, since the thickness of the contact portion of their flat blades is less than the spacing between the rollers their gold bearing contact portions are not twisted or mangled as they pass between the rollers. Therefore, the blades do not usually self-fuse upon themselves.

With the shattering of the bulbs the switch blades are liberated and fall commingled with the glass fragments onto the vibratory feeder table 19. From here the now liberated switch blades and the fragmented glass particles are fed to the magnetic separator 20 for magnetic separation. This is conventionally done by use of a roller having selectively magnetized portions. As the materials are fed onto and over the rotating roller the unmagnetized glass particles fall into one of the collection bins positioned beneath the separator while the magnetized switch blades are held onto the roller until they have been moved to a point above the other collection bin. At this angular location on the roller they pass over a non-magnetized roller portion whereupon they are released and gravitate down into the other collection bin. The blades are then processed to separate their gold content as previously described.

It thus is seen that a method has now been devised for reclaiming component materials of an article of manufacture having one or more metallic elements encased within a brittle bulb or housing. It should however be understood that the just-described embodiment merely illustrates principles of the invention in one preferred form. Many modifications, additions, and deletions may, of course, be made thereto without departure from the spirit and scope of the invention as set forth in the following claims.

What is claimed is:

1. A method of reclaiming component materials of an article of manufacture having a metallic element at least partially encased within a brittle bulb with a portion of the element encased within the bulb being of a predetermined thickness, and which method comprises the steps of passing the article between two rotating rollers spaced apart a distance less than a dimension of the brittle bulb but greater than the thickness of the metallic element encased portion thereby shattering the bulb without altering the structure of the metallic element encased portion substantially, and then separating the shattered brittle material from the metallic element.

2. The reclamation method of claim 1 wherein the bulb is of a generally cylindrical configuration and wherein the method includes the step of spacing the two rotating rollers apart a distance less than the diameter of the cylindrical bulb.

3. The reclamation method of claim 2 wherein an annular portion of the brittle bulb fused to the metallic element has an outside diameter less than the bulb diameter and the roller spacing distance, and wherein in passing the article between the two rotating rollers the bulb is shattered to an extent so as to create fissures which extend through the bulb annular portion thereby breaking its fusion with the metallic element.

4. The reclamation method of claim 1 wherein the shattered material is vitreous and the metallic element is separated from the vitreous material by magnetic separation means.

5. The reclamation method of claim 1 wherein the article is passed between two serrated rollers being rotated in mutually counter-rotational directions.

6. The reclamation method of claim 1 wherein the metallic element encased portion has a layer of gold coated upon a metallic substrate, and wherein following separation of the shattered brittle material from the metallic element the gold coating is removed from the metallic substrate.

* * * * *